United States Patent
Laudereau et al.

(10) Patent No.: US 12,086,681 B2
(45) Date of Patent: Sep. 10, 2024

(54) METHOD FOR DETECTING AND READING A MATRIX CODE MARKED ON A GLASS SUBSTRATE

(71) Applicant: SAINT-GOBAIN GLASS FRANCE, Courbevoie (FR)

(72) Inventors: Jean-Baptiste Laudereau, Paris (FR); Vincent Nier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/042,722

(22) PCT Filed: Jul. 22, 2021

(86) PCT No.: PCT/EP2021/070592
§ 371 (c)(1),
(2) Date: Feb. 23, 2023

(87) PCT Pub. No.: WO2022/042961
PCT Pub. Date: Mar. 3, 2022

(65) Prior Publication Data
US 2023/0351130 A1   Nov. 2, 2023

(30) Foreign Application Priority Data

Aug. 24, 2020   (EP) .................................... 20315389

(51) Int. Cl.
*G06K 7/14*   (2006.01)
(52) U.S. Cl.
CPC .................. *G06K 7/1417* (2013.01)
(58) Field of Classification Search
CPC ..................... G06K 7/1417; G06K 7/1482
See application file for complete search history.

(56) References Cited

U.S. PATENT DOCUMENTS

| 9,396,377 B2 | 7/2016 | Van Der Merwe et al. |
| 2017/0024593 A1 | 1/2017 | Perrotton et al. |

(Continued)

FOREIGN PATENT DOCUMENTS

| CN | 106446750 A | 2/2017 |
| CN | 109543486 A | 3/2019 |

(Continued)

OTHER PUBLICATIONS

International Search Report as issued in International Patent Application No. PCT/EP2021/070592, dated Nov. 2, 2021.

(Continued)

*Primary Examiner* — Sonji N Johnson
(74) *Attorney, Agent, or Firm* — Pillsbury Winthrop Shaw Pittman LLP

(57) ABSTRACT

A computer implemented method for detecting and reading a barcode in an image of a marked glass substrate, the method taking as input a raster image of at least one portion of the marked glass substrate and providing as output an abstract image of the barcode, the method including (a) computing a probability occurrence θ of the barcode in the raster image with a first trained convolutional artificial neural network; (b) computing coordinates of representative points of a boundary of the barcode in the raster image according to a given threshold σ for the probability occurrence θ computed at (a); (c) cropping the raster image to the boundary of the barcode according to the coordinates computed at (b), and (d) computing with a second trained convolutional artificial neural network a tensor of probabilities for each pixel of the cropped raster image, the tensor being the abstract image of the barcode.

16 Claims, 6 Drawing Sheets

(56) References Cited

U.S. PATENT DOCUMENTS

| | | |
|---|---|---|
| 2019/0099892 A1 | 4/2019 | Namiki |
| 2019/0384954 A1 | 12/2019 | Lyubimov et al. |
| 2020/0192613 A1* | 6/2020 | Brady .................. G06F 3/1232 |
| 2021/0124886 A1* | 4/2021 | Hawks .................. G06N 20/10 |

FOREIGN PATENT DOCUMENTS

| | | |
|---|---|---|
| RU | 2 726 185 C1 | 7/2020 |
| WO | WO 2014/128424 A1 | 8/2014 |
| WO | WO 2015/121549 A1 | 8/2015 |

OTHER PUBLICATIONS

Lin, T.-Y., et al., "Feature Pyramid Networks for Object Detection," IEEE conference on computer vision and pattern recognition, (Year: 2017), pp. 2117-2125).

Redmon, J., et al., "You Only Look Once: Unified, Real-Time Object Detection," Proceedings of the IEEE conference on computer vision and pattern recognition, (Year: 2016), pp. 779-788.

He, K., et al., "Deep Residual Learning for Image Recognition," Proceedings of the IEEE conference on computer vision and pattern recognition, (Year: 2016), pp. 770-778.

Lin, T.-Y., et al., "Focal Loss for Dense Object Detection," Proceedings of the IEEE international conference on computer vision, (Year: 2017), pp. 2980-2988).

Ronneberger, O., et al., "U-net: Convolutional Networks for Biomedical Image Segmentation," International Conference on Medical image computing and computer-assisted intervention, (Year: 2015), 8 pages.

\* cited by examiner

METHOD FOR DETECTING AND READING A MATRIX CODE MARKED ON A GLASS SUBSTRATE

CROSS-REFERENCE TO RELATED APPLICATIONS

This application is the U.S. National Stage of PCT/EP2021/070592, filed Jul. 22, 2021, which in turn claims priority to European patent application number 20315389.5 filed Aug. 24, 2020. The content of these applications are incorporated herein by reference in their entireties.

TECHNICAL FIELD

The invention pertains to computer implemented methods for detecting and reading a barcode marked on a glass substrate. More precisely, the method according to the invention relies on an image processing of a raster image of a barcode through chained convolutional artificial neural networks in order to provide a versatile, highly adaptive, memory efficient, and reliable probabilistic approach to detect and read a variety of barcodes in image of various kinds of glass substrates, in various recording conditions.

BACKGROUND ART

In the glass industry, it is common practice to mark manufactured glass substrates, e.g. glass sheets, with tracking code to track processing and handling stages of the sheets during their lifetime, e.g. cutting stage, coating deposition, thermal treatment. The tracking code is often a one- or two-dimensional code, called barcode or matrix barcode, in which relevant data are encoded, such as an identification number, a timestamp and/or a location stamp related to these processing and handling stages. The tracking code may also be an entry key for databases allowing to retrieving some records regarding the processing history, the features, the physicochemical properties and/or the quality, e.g. defects, of the glass substrates, e.g. WO 2014/128424 A1.

Various methods for marking a glass substrate with a tracking code are available in the art. For instance, the tracking code can be applied on the surface of the glass substrate as a printed adhesive sticker, or more commonly, directly engraved in the bulk surface of the glass substrate by use of an electromagnetic radiation, e.g. a laser. An engraved tracking code is generally located on the glass substrates so that it can be visualized from one of its main faces of and/or from one of its edge by automatic scanning systems arranged along a processing line, e.g. WO 2014/128424 A1, WO 2015/121549 A1.

These automatic scanning devices often implement various optical devices and image processing methods to detect tracking codes in acquired digital images of glass substrates and extract the codes from those images in an adequate format for their conversion into an alphanumerical number for further processing.

An inconvenient of the current processes for tracking codes, whether the codes are engraved or not, is the wide variety in size, orientation, brightness and aspect ratio of the tracking codes depending on the method used to mark them on glass substrates and the record conditions in which images of them are acquired by image acquisition devices, e.g. ambient light, light source properties, camera type and specs. A direct negative consequence is that a method, process or system for detecting, reading and decoding a code on the glass substrates must often compel with the specifications of that code and its imaging or record conditions. Accordingly, such a method, process or system is often designed exclusively for a given code type in given imaging conditions. Therefore, the use or the transfer of a method, process or system for detecting, reading and/or decoding a tracking code which was designed for a given tracking code in given conditions in order to detect, read and/or decode another code in another conditions is not straightforward, and often impossible without significant modifications.

Furthermore, a method, process or system designed for detecting, reading and/or decoding a given tracking code from one of the main faces of a glass substrate cannot often readily be used for detecting, reading and/or decoding the same code from the edge of said substrate, and reversely. And last, but not least, the varying features, properties and orientations of the glass substrates themselves during their handling, carrying, positioning and processing may influence the processing of the tracking code, further complicating the reuse of existing method, process or system.

Upon reading, data encoded in a tracking code are often decoded, i.e. converted into an alphanumerical number for further use as entry key to retrieve relevant data regarding the glass substrates. The decoding operation is generally done through various image processing algorithms. These algorithms often require the tracking code to be in a standardized format, for instance of standardized size, features, aspect ratio or shape, and the image of which to be provided with a standardized resolution, i.e. a given number of pixels by barcode feature, in order to avoid homothetic side-effects resulting in erroneous outputs during decoding.

As an illustrative example of a homothetic side-effect, supposing an image processing decoding algorithm which requests a 10×10 px image, and a 15×20 px image of a tracking code, when the image is provided to the algorithm, said algorithm will subsample 10×10 px of that image, resulting in wrong decoding. Resizing or re-sampling the image is here mandatory before to proceed with decoding. Such operation is not straightforward and has to be carefully done to avoid loss of encoded data. In particular, the loss of data may be serious when the image is upsized, or is too noisy because of low-quality or unsuitable recording device, e.g. camera, and/or bad recording conditions.

Also, these algorithms often assume that some properties of the image of the tracking codes are known and common to all codes so one can use human-made pre-defined sequences of image processing operations to prepare the tracking code image to be detectable, readable and/or decodable object. For instance, such algorithms may assume that the code is square or rectangle-shaped, the contrast and/or brightness is high enough and/or the features of the code are clearly separated. If these assumptions are not met, said pre-defined sequences of image processing operations often lead to detection, reading and/or decoding failures.

As an illustrative example, a system used to obtain an image of the tracking code may be tilted, and/or the glass substrate may move during acquisition, and/or errors of positioning may occur so that the image of the code is not square or a rectangle shaped but has instead a sheared, slanted or trapezoidal shape. The algorithms may then not find the tracking code features where they are expected to be, and/or may even miss some of them, resulting in detection, reading and/or decoding failures. Previous corrections of shear, slant or trapezoidal deformations are required for the proper functioning of the system, but are not straightforward.

CN 109543486 A describes an image processing method for recognizing and repositioning tracking codes of differently oriented or arranged surfaces. The method first uses a convolution neural network to locate a tracking barcode, and then an affine transformation for position, rotation and/or scale corrections in order to provide a barcode in a standardized format for further processing by a standard decoding process. However, this method is ineffective for dealing with tracking codes with various aspect ratios, including shear, slant and/or trapezoidal deformations, non-linear deformations such as barrel or pincushion distortions, as well as local defects such as dust or non-uniform brightness.

CN 106446750 A describes an image processing method for recognizing a tracking code by evaluating a features score of a variety of non-overlapping regions of the image containing the tracking code, and merging the regions according to a given rule for the features score in order to determine the location of the tracking code within the image. This method aims to overcome the hurdle to provide training data for a machine learning based approach. However, it relies on the processing of image histograms of grey-scaled images, thus limiting its use to such images. Furthermore, as the method relies on the histograms, it does not provide any information regarding the shape of the code and does not provide any means for image correction. The above mentioned problems remain unsolved. The method is ineffective for the processing of images of tracking codes with varying aspect ratios including shear, slant, trapezoidal and/or non-linear distortions and/or non-uniform brightness.

US 20190099892 A1 describes a general convolutional neural network based system for recognizing various sized and shaped tracking codes on surfaces. A neural network is used to learn, and then correct, image distortions caused by the image recording system. During the learning step, the neural network takes, as learning data, recorded images of tracking codes and labelled data representing ideal version of the recorded images. A drawback is that the trained network is specific to the recording system and environment and its use or transfer in another recording conditions requires a new learning stage and, then a priori knowledge of the information contained in the tracking codes (for labelling). Furthermore, as the method is not coupled with a detection feature, it is the inefficient to manage false positives and/or negatives when some features in an image of non-tracking code are recognized as features of learned images of tracking, and, inversely, when features in an image of tracking code are not recognized as such.

SUMMARY OF THE INVENTION

Technical Problem

There is a need for a method which can solve the above described problems. In particular, there is a need for method which provides a versatile, highly adaptive, memory efficient, and reliable approach to detect and read a variety of tracking codes on a various kinds of glass substrates, in various recording conditions.

Solution to Problem

The present invention relates to a computer implemented method for detecting and reading a barcode marked on a glass substrate as described in claims. It relies on the image processing of a raster image of a portion of a glass substrate by chained convolutional artificial neural networks in order to detect a barcode in said image and provide an abstract representation of it as a probabilistic tensor for further decoding.

The method has numerous outstanding advantages. Thanks to its probabilistic approach, it can detect and read, on a various kinds of glass substrates, tracking codes, i.e. barcodes, in various formats, i.e. varying in size, brightness, contrast and/or aspect ratio, including shear, slant or trapezoidal distortions, local defects and/or non-uniform features, from any raster image of the portion of surface of a glass substrates onto which a tracking code may be present. The method is able to recognize features of the tracking codes in images beyond image distortions, so that it adapts to various image recording conditions.

In the method, a first convolutional neural network provides a probability of detection of a barcode, which may in turn be used to adjust the sensitivity of the method to various barcode format. A second convolutional neural network transforms any raster image of a barcode into a standardized low memory image of it by keeping only the valuable information for a possible later on conversion into an alphanumeric number or other format.

In other words, the method is able to efficiently detect a possible barcode in a raster image and extract the valuable features of the image to provide an abstract representation for the barcode which contains only the information required for its processing by decoding or converting algorithms.

DESCRIPTION OF EMBODIMENTS

Manufactured glass substrates, e.g. glass sheets, are often marked with tracking code to track processing and handling stages of the sheets during their lifetime, e.g. cutting stage, coating deposition, thermal treatment.

Figure 1:
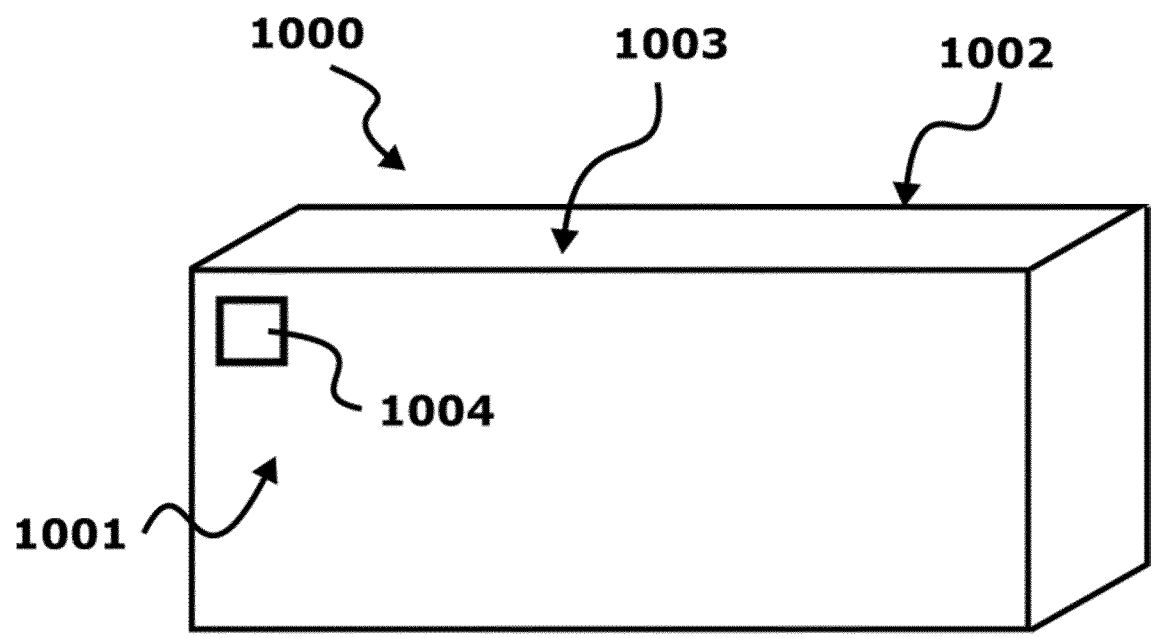
FIG. 1 is a schematic representation of glass sheet with a barcode on its surface.

FIG. 1 provides a schematic illustration of a glass sheet 1000 with a tracking code 1004. The glass sheet 1000 comprises a first main surface 1001, a second main surface 1002 and an edge 1003. The tracking code 1004 is commonly located on the glass substrate 1000 so that it can be visualized from one of its main faces 1001, 1002 of and/or from one of its edge 1003 by automatic scanning devices arranged along a processing line. In this scope, it is often located near the edge 1003.

The tracking code 1004 can be provided on the surface of one of the main faces 1001, 1002 of the glass sheet 1000, as a printed adhesive sticker, or directly engraved in the bulk surface of the glass substrate by use of an electromagnetic radiation, e.g. a laser.

Figure 2:
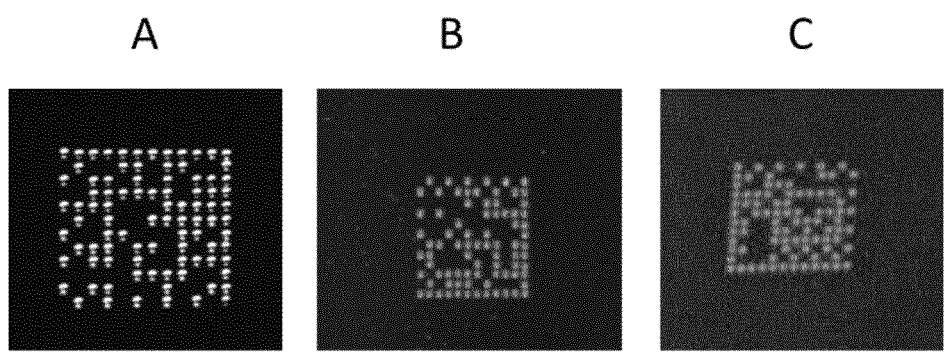
FIG. 2 depicts example images of barcodes in various formats.

FIG. 2 provides three examples A, B and C of images of tracking codes as a 2D barcodes, also called datamatrix, marked on transparent glass substrates from three different manufacturing plants. Barcodes varies in size, orientation and aspect ratio, depending on the method and/or system used to mark them on glass substrates. The solid 'L' shaped borders (called 'finder' patterns) are not in same orientation: oriented top right for A, bottom right for B and bottom left for C. The aspect ratios are also different: a square for A, a rectangle stretched upwards for B and as slanted shape like a rhombus for C.

As explained above, the variety in size, orientation, brightness and aspect ratio for barcodes has numerous negative consequences, in particular regarding the reuse of an existing method for detecting and reading a barcode, homothetic side effects, and false positives and/or negatives.

Existing methods, processes or systems for detecting, reading and decoding a code on glass substrates are designed exclusively for given kind of tracking codes, for instance a code with a given size, orientation and aspect ratio, in a given recording environment, for instance with given light conditions, a given image acquisition system and a given position of the glass substrate. Their lack of versatility prevents from using them directly for detecting, reading and decoding another kind of code and/or same code in another configuration. Furthermore, image processing algorithms used to convert tracking code into an alphanumerical number often requires standardized format to prevent erroneous outputs during conversion. False positives and/or negatives during detection of barcode must also be correctly managed for same reasons.

It is an aim of the invention to solve the problem by providing a versatile, highly adaptive, memory efficient, and reliable method to detect and read a barcode in an image of a marked glass substrate. The method relies on an image processing of a raster image of a barcode through chained convolutional artificial neural networks as a reliable probabilistic approach to detect and read a variety of barcodes in images of various kinds of glass substrates. The method reduces the risk of false positives and/or negatives.

Figure 3:
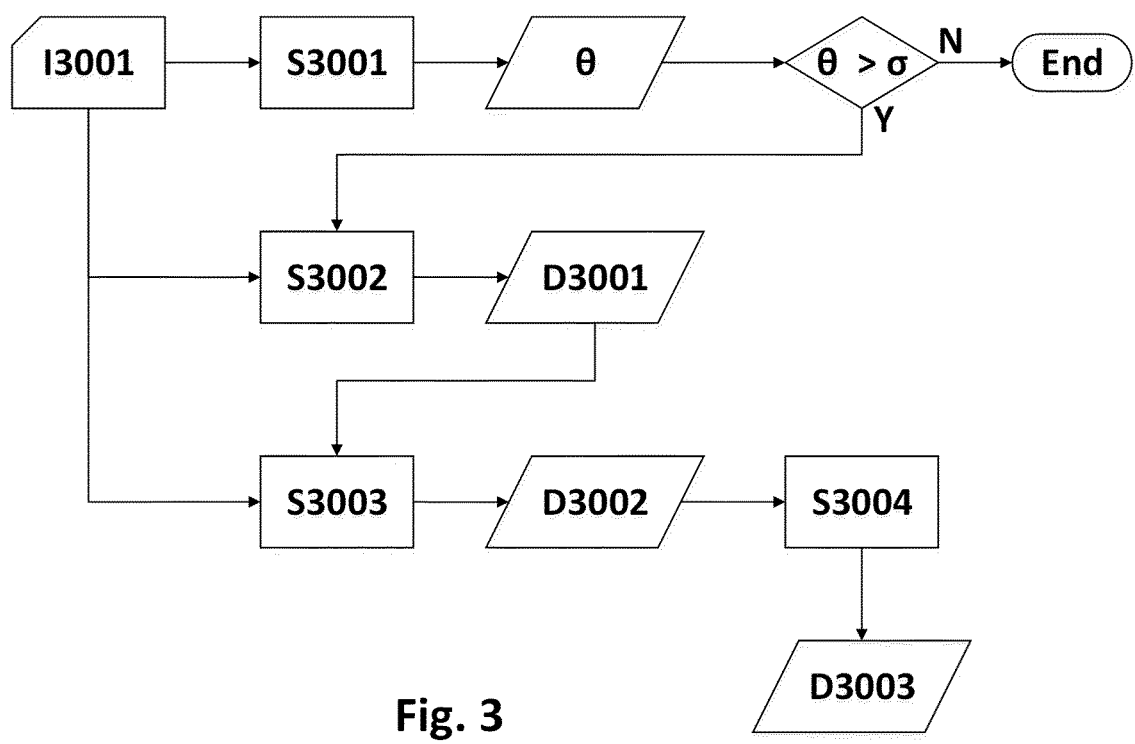
FIG. 3 is a logical data flow diagram of a method according to the invention.

With reference to [FIG. 3], there is provided a computer implemented method 3000 for detecting and reading a barcode 1004 in an image of a marked glass substrate 1000, said method taking as input a raster image 13001 of at least one portion of the marked glass substrate 1000 and providing as output D3003 an abstract image of said barcode 1004, and said method comprising the following steps:
  (a) computing S3001 a probability occurrence $\theta$ of a barcode 1004 in the raster image with a first trained convolutional artificial neural network;
  (b) computing S3002 coordinates D3001 of representative points of the boundary of the barcode 1004 in the raster image 13001 according to a given threshold G for the probability occurrence $\theta$ computed at step (a);
  (c) cropping 53003 the raster image 13001 to the boundary of the barcode according to said coordinates D3001 computed at step (b);
  (d) computing 53004 with a second trained convolutional artificial neural network a tensor D3003 of probabilities for each pixel of the cropped raster image D3002, said tensor D3003 being the abstract image of the barcode 1004.

In the context of the invention, the word 'barcode' encompasses 1D linear barcodes, e.g. UPC barcodes, ITF barcodes, ENA barcodes, . . . and 2D matrix barcodes, e.g. QR code, Aztec code, data matrix, data matrix ECC200, data matrix ECC 000-140, dot code, maxi code, SPARQ code, . . . .

The method according to the invention takes raster images as inputs. A raster image or a raster graphic is a dot matrix, i.e. two-dimensional array, which represents a grid of pixels. The colour of each pixel is determined by a combination of primary colours that are represented by a number of bits assigned to each pixel in different channels, each channel corresponding to a primary colour according to the colour space, e.g. greyscale, black and white (binary), RGB, CMYK, . . . . For instance, a greyscale raster image comprises a single channel in which the value of each pixel represents a level of intensity of light as a shades of grey scale. An RGB raster image comprises three channels in each of which the value of each pixel represents a level of intensity in the respective red, green and blue colour scales.

In embodiments of the method according to the invention, the raster image 13001 may be a one channel raster image, in particular greyscale or black and white raster image. One channel raster image allows to get image of portions of glass substrate with enough resolution and feature details for detecting and reading barcodes while reducing computer data storage and computation workload on central and/or graphical processor units.

Vector images or a vector graphics, i.e. images in which the features are represented by points in a coordinate system, can also be used with the method provided that they are rasterized, i.e. converted in raster images, before to be input.

In the scope of the invention, a convolutional neural network is a neural network comprising an input layer, an output layer and multiple hidden layers between the input and output layers. It comprises non-linear stacked layers, possibly fully connected non-linear staked layers, of neurons performing convolution operations on input data with convolution kernels of a given sizes to produce features maps. It may also comprise linear and/or non-linear dense layers, i.e. non convolutional layers, activation layers, down sampling layers, e.g. pooling layers, and standardization layers, e.g. batch normalization layers.

The method is a two stages approach of the detection and reading of barcode. As a first stage, the first trained convolutional neural network detects any barcode in the input raster image and provides a confidence value, i.e. a probability occurrence, $\theta$, associated to that detection. A sensitivity threshold, $\sigma$, at step (b) allows to adjust the sensitivity of the method, which in turn determines the continuation of the method, i.e. the computation S3002 of the coordinates D3001 of representative points of the boundary of the barcode 1004, and the execution of steps (b) to (d).

The use of a trained convolutional neural network with a probabilistic approach reduces the risk of false positives and/or negatives as the threshold, $\sigma$, can be adjusted according to the quality of the raster image. The image quality may be influenced by the accuracy level of the image capture system and the optical properties of the glass substrates, and the threshold, $\sigma$, may help to reduce unexpected pitfalls during detection. A value of 0.5, in particular 0.1, for the threshold, $\sigma$, is a valuable starting points in most situations.

As a second stage, depending on the value of the probability occurrence, $\theta$, the coordinates D3001 of representative points of the boundary of the barcode are computed, the image is cropped according to said boundary and the second convolutional neural network transforms the cropped raster image of a detected barcode into a probability tensor which may be represented as a standardized low memory image of it by keeping only the valuable information.

The computation S3002 of the coordinates of representative points of the boundary of the barcode can be carried out in several ways. It can be directly implemented in the first convolutional neural network in the form of an object detector convolutional network, as exemplified thereinafter in certain embodiments of the invention, or implemented as an independent image processing algorithm, in particular as an edge detection algorithm, to which the raster image is fed. Examples of edge detection algorithm are thresholding, Canny filter, or Sobel filter that are all well documented in the art.

Representative points of the boundary, i.e. edges of the boundary, may vary depending on the shape of the barcode. In most cases, the boundary of barcodes can be represented by simple geometrical shapes, such as squares or rectangles. The representative points can then be the spatial coordinates of the corners of that shapes, or the spatial coordinates of the centre of the barcode and the dimensions of a model polyhedral frame, such as a square or rectangle, centred on said centre.

At step (c), the raster is cropped to the boundary of the barcode in order to extract the portion of the raster image which contains the barcode. The cropping operation to the boundary of the barcode is not to be interpreted strictly as on operation in which the borders of the image correspond exactly to the boundary of the barcodes, i.e. the boundary of the smallest part of the image in which all the features of the barcode are contained. The area of the cropped image may be greater than said smallest area. What is important is that the image is reasonably cropped as close as possible to the boundary of the barcode so that the barcode features take up the most of the cropped image area, ideally occupy the maximum of the area. In other word, most part of the cropped image area ideally contains the maximum of valuable information regarding the barcode features.

Cropping methods are basic method in image processing and are well documented in the art.

The second convolutional neural network transforms the cropped raster image containing the barcode into a standardized low memory image of it by keeping only the valuable information. It provides a tensor of probabilities for each pixel of the cropped raster image, said tensor forming an abstract image of the barcode, i.e. an image wherein the inherent context related to its record conditions and non-related barcode features is removed. Representing an image by a tensor of probabilities for each pixel is advantageous feature of the invention as for each pixel it is provided some kind of confidence interval regarding the performance of the neural network in the reading of valuable pixels in the cropped raster image to produce an image of the barcode it contains. Therefore, the second convolutional neural network can be tuned to further reduce the risk of false positives and/or negatives by darkening or blackening, pixels with low probability and highlighting pixels with high probability in order to reduce loss of encode data. In most cases, such darkening/highlighting operation may advantageously provide a black and white image of the barcode.

Moreover, as any input image of barcode is transformed into a constant sized abstract image in which each pixel is represented by a level of probability, i.e. the output image is one channel image, the method provides high quality, highly reproducible, standardized images. The images are also in form of structurally simplified dot matrix. Homothetic side-effects and loss of data during further processing of the images with decoding algorithms are then reduced while the output images require less memory space in computer data storage.

Decoding algorithms often require the tracking code to be in a standardized format, and the image of which to be provided with a given resolution. It is an advantage of the method that it can take, as input, a raster image of an arbitrary size and provide, as output, an abstract image of a given size.

Barcodes, in particular 2D matrix barcodes, may be high-density symbol. Despite the error correction codes that barcodes may contain to increase reliability, it is preferable to avoid, or at least reduce, the loss of features after image processing to prevent erroneous outputs or failures upon decoding with decoding algorithm. However, it is known that convolutional neural network, because of convolutional operations, produces rich semantic features but low spatial resolution maps. In some cases, this drawback may lead to some loss of data regarding some detailed features of the original image, in particular for barcodes.

In an advantageous embodiment of the invention, the first convolutional artificial neural network may be based on a Feature Pyramid Network architecture. Surprisingly, conventional neural network based on FPN architecture allows to remedy the afore mentioned disadvantage, in particular for barcodes.

The Feature Pyramid Network (FPN) architecture is extensively described in Conference Proceedings—T.-Y. Lin, P. Dollar, et al., Feature pyramid networks for object detection, Proceedings of the IEEE conference on computer vision and pattern recognition, 2017. Briefly, the FPN architecture allows to take an image of an arbitrary size as input and to output proportionally sized features maps. It combines a bottom-up pathway, a top-down pathway with lateral connections between layers of the network to produce resolution enhanced semantic rich features maps at different stages, also referred to pyramid levels, of the neural network.

The bottom-up pathway is a feedforward computation of the convolutional layers which computes features maps at several scales with a given scaling step, e.g. 2. A pyramid level is associated to each set of features maps outputs from the last layer of selected blocks of convolutional layers.

The top-down pathway performs upsampling operations on spatially coarser feature maps from higher pyramid levels to produce higher resolution features maps. Lateral connections between pyramid levels of the bottom-up and top-down pathways then merge the features maps of the top-down pathway with features maps of the same spatial size from the bottom-up pathway in order to produce resolution enhanced semantic rich features maps.

In particular embodiment of the method according to the invention, the first convolutional neural network may be based on a Feature Pyramid Network architecture integrated to a one-stage or two-stage object detector convolutional neural network. The advantages of this embodiment is that the computation S3002 of the coordinates of representative points of the boundary of the barcodes is directly implemented as an internal function of the first neural convolutional neural network.

In order to detect object, a neural network with a FPN architecture is advantageously combined, i.e. integrated or adapted, to a one-stage or two-stage object detector convolutional network, to which the resolution enhanced semantic rich features maps are provided as inputs. One-stage or two-stage object detector convolutional networks are well documented in the art.

In two stage object detector convolutional networks, a first stage allows to find a subset of regions of interest in an image that might contain an object, and a second stage performs classification operations on objects in each region. These networks combine rectangular regions proposal with convolutional neural network features. Examples of two-stages object detector convolutional network are R-CNN, Fast R-CNN, both using region proposal functions as selective search algorithm to propose regions of interest, and Faster R-CNN which uses a region proposal network (RPN) to predict regions of interest. These examples are extensively documented in the art.

One-stage detector convolutional networks use a single convolutional network to predict the region of interest and their associated levels of probability. Contrary to two-stages object detector neural networks, the operations are carried out in the whole image instead of in parts of it which have the highest probabilities. An example of one-stage object detector convolutional neural network is the real-time object detector YOLO network (Conference Proceedings—J. Redmon, S. Divvala, et al., You only look once: Unified, real-time object detection, Proceedings of the IEEE conference on computer vision and pattern recognition, 2016).

In an embodiment of the invention, the first convolutional artificial neural network may comprise a residual neural network as backbone. The backbone is defined in the art as the architecture of feature extractor network which extracts features maps from a raster image provided as input. A residual neural networks may be parts of a convolutional networks or the general architecture according to of to which the convolutional neural network is designed. For instance, a neural network based on a FPN, possibly associated to one-stage or two stage object detector convolutional neural network, may have a residual neural network as backbone for the features maps extraction.

A residual neural network comprises skip connections, more precisely identity shortcut connections, between layers of neurons that add the outputs from previous layers to the outputs of next layers, i.e. connections which skips one or more layers of neurons. Residual neural networks often use Rectified Linear Unit (ReLu) as activation functions to introduce nonlinearities as means to reduce the vanishing gradient effect, then to increase learning speed and efficiency. Residual neural network are well documented in the art, for instance in Conference Proceedings—K. He, X. Zhang, et al., Deep residual learning for image recognition, Proceedings of the IEEE conference on computer vision and pattern recognition, 2016).

The main advantage of residual neural network is a reduction of overfitting and loss of information between successive layers of neurons. In the context of invention, residual neural network backbone allows to increase the adaptability and versatility of the method. Examples of residual neural networks are ResNet and DenseNet.

In certain embodiments of the method according to the invention, the first trained convolutional artificial neural network is a network with at least 10 layers, in particular at least 20 layers, more preferably at least 50 layers.

In an example embodiment of the method of the invention, the first convolutional neural network is the RetinaNet neural network. RetinaNet is developed by the Facebook AI Research and described in Conference Proceedings—T.-Y. Lin, P. Goyal, et al., Focal loss for dense object detection, Proceedings of the IEEE international conference on computer vision, 2017. It is based on a FPN architecture with a ResNet-50 backbone and comprises a one-stage object detector. Examples of computer implementations of RetinaNet architecture are available in Keras/TensorFlow libraries developed by the Google Brain Team. In the example, RetinaNet uses randomly initialized weights upon training and example allows to have all advantages discussed above regarding FPN architecture and residual neural network for barcodes detection.

As explained above, the second trained convolutional neural network provides a tensor of probabilities for each pixel of the cropped raster image, said tensor forming an abstract image of the barcode In this scope, in advantageous embodiments of the invention, the second convolutional neural network may be designed as a two-stage architecture, the first stage producing features maps and the second stage performing classification so that it can perform image segmentation cropped raster images.

The first stage may comprise at least two, in particular, at least three sets of multiple, in particular two, convolutional layers, each set possibly associated with at least one maximum pooling based down sampling layer and/or at least one batch normalization based standardization layer after each set of convolutional layers. The second stage may comprise upsampling layers, concatenation layers, batch normalization layers, and a set of fully connected non-convolutional neural network with at least two, in particular at least three neural layers.

Figure 4:
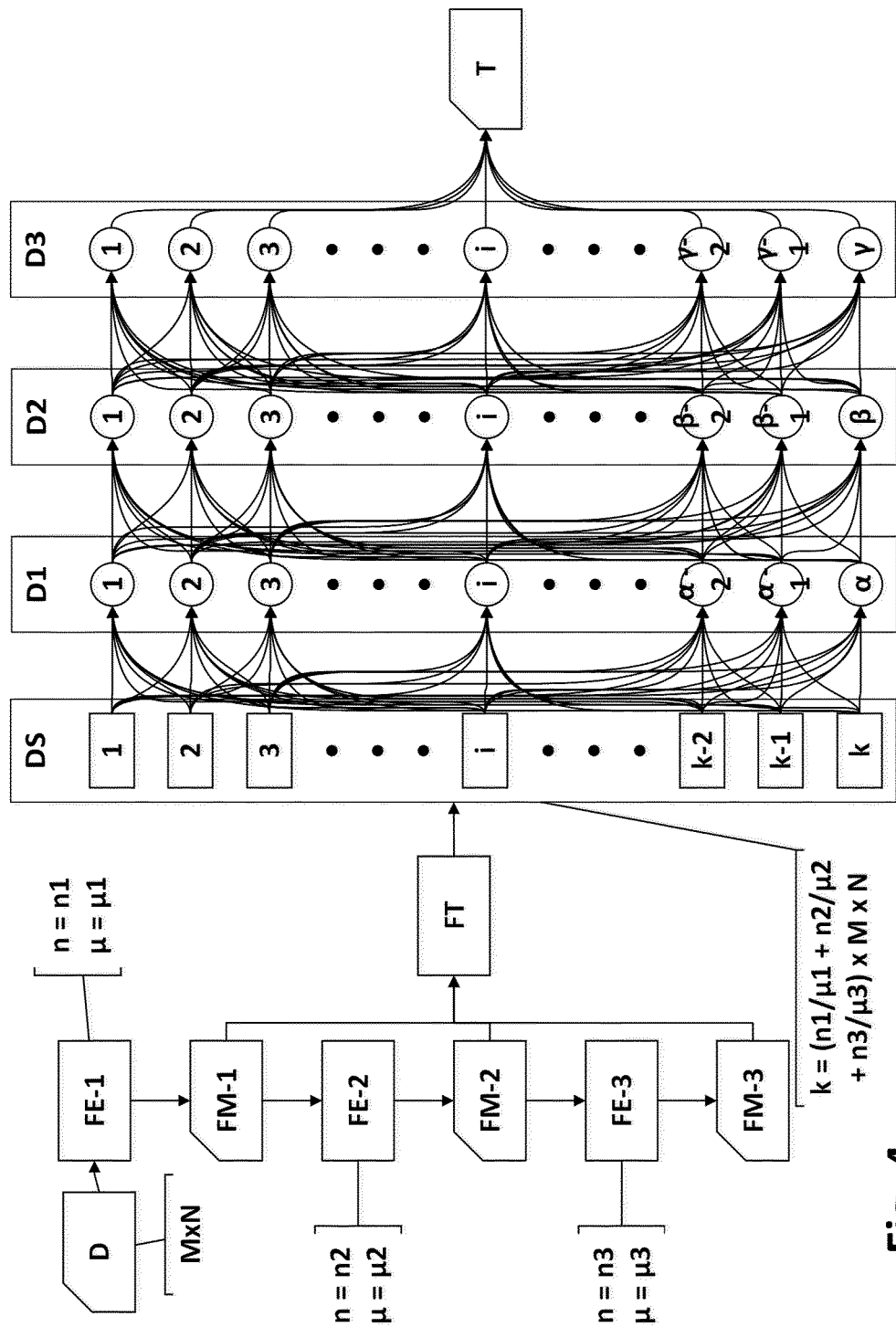
FIG. 4 is a schematic representation of the architecture of an example embodiment of the second convolutional neural network of the method.

An example embodiment for the second convolutional neural network is illustrated on [FIG. 4] and 5. With reference to [FIG. 4], the second trained convolutional neural network may comprise a succession of three features extractors, FE-1, FE-2 and FE-3, a flatten layer FT performing concatenation operations, and three fully connected, i.e. dense, non-convolutional neural layers, D1, D2 and D3 with respectively $\alpha$, $\beta$, and $\gamma$ nodes or output units.

Figure 5:
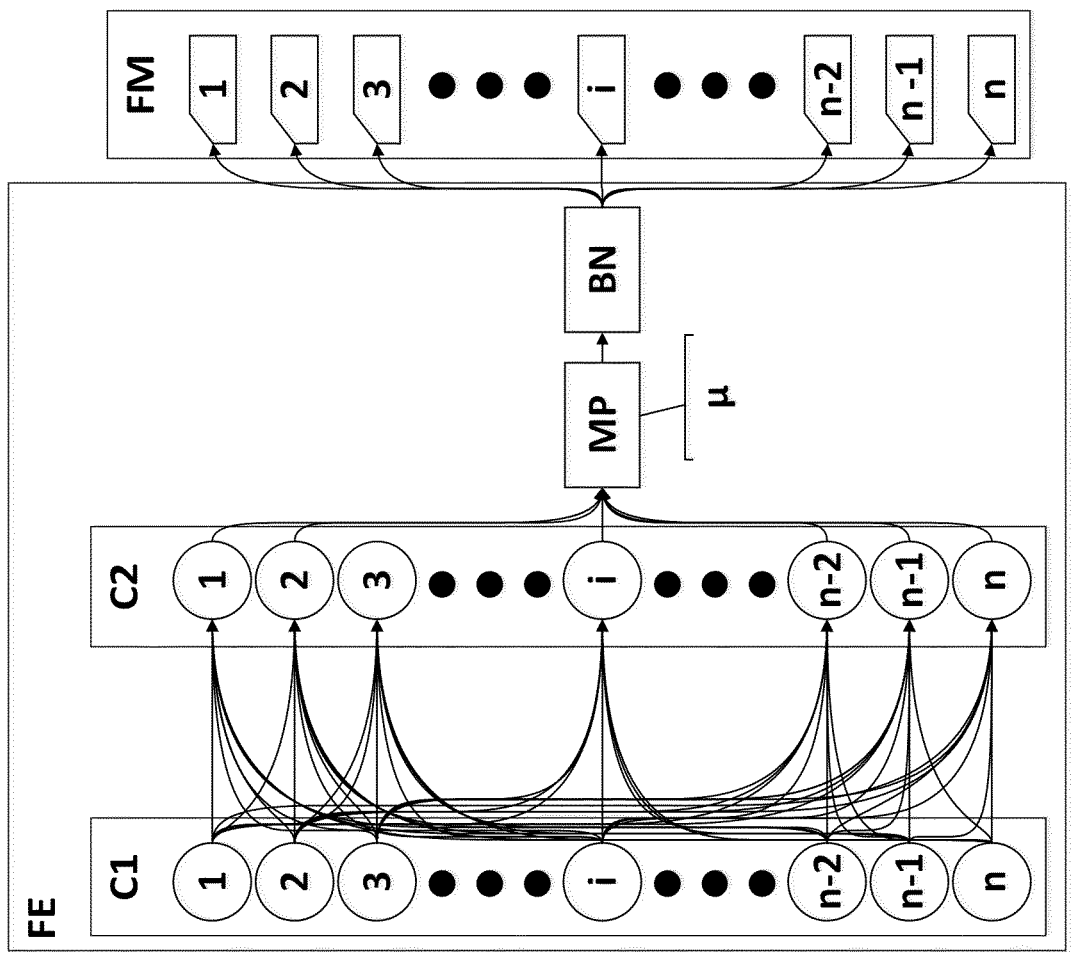
FIG. 5 is schematic representation of a sub-structure of the example embodiment of the second convolutional neural network of the [FIG. 4].

The general architecture of a feature extractor, FE, is illustrated on [FIG. 5]. It comprises two convolutional neural layers, C1 and C2, with n nodes or output units, a maximum pooling based down sampling layer, MP, with a reduction window size, and batch normalization based standardization layer, BN. A feature extractor provides set FM of n features maps.

With reference to [FIG. 4], the second trained convolutional neural network operates as follows:

a cropped raster image D with a size M×N, which corresponds to D3002 on [FIG. 3], is provided as input to the feature extractor FE-1;

FE-1 provides as output a first set FM-1 of n1 features maps whose dimensionalities are reduced by a factor $\mu 1$;

the first set FM-1 is provided as input to the second feature extractor FE-2 which in turn provides as output a second set FM-1 of n2 features maps with dimensionality reduced by a factor $\mu 2$;

the second set FM-3 is provided as input to the third feature extractor FE-3 which in turn provides as output a set FM-3 of n3 features maps with a dimensionality reduced by a factor $\mu 3$;

the three features maps FM-1, FM-2 and FM-3 are flatten and concatenated by the FT layer to provide a dataset DS of $k=(n1/\mu 1+n2/\mu 2+n3/\mu 3)\times M\times N$ features;

the dataset DS of features is provided to three fully connected non-convolutional, dense, layers D1, D2 and D3 which in turn provide as output a tensor T corresponding to the tensor D3003 of probabilities of [FIG. 3].

As an illustrative example of concrete implementation of the afore described example embodiment for the second trained neural network, the following parameters may be used:

D has a M×N=144×144 pixels dimension and 1 channel;
n1=128, n2=256 and n3=512;
$\mu 1=\mu 2=\mu 3=2$;

a 15 pixels size convolution kernel for each layer C1, C2 of feature extractor FE-1;

a 5 pixels size convolution kernel for each layer C1 and C2 of the features extractors FE-2 and FE-3;

$\alpha=512$, $\beta=256$ and $\gamma=144$ (12*12);

each layer C1 and C2 of the three features extractors FE-1, FE-2 and FE-3 and the layers D1 and D2 have a Rectified Linear Unit (RELU) as activation functions;

the layer D3 has a sigmoid function as activation functions.

Those parameters allow to read and convert a 144×144 pixels cropped raster image of portion of a glass substrate, in particular a transparent glass substrate, comprising a barcode, in particular a 2D datamatrix, and into an 12×12 pixels abstract image, in particular a binary image, of the barcode.

As alternative example embodiment for the second convolutional neural network, a U-Net architecture as described in Conference Proceedings—O. Ronneberger, P. Fischer, et al., U-net: Convolutional networks for biomedical image segmentation, International Conference on Medical image computing and computer-assisted intervention, 2015, may be used.

The first and second convolutional artificial neural networks are feedforward neural networks and, as learning algorithms, they are trained with a backpropagation approach with training and validation datasets of images and targets. For the first convolutional neural network, the training set of images may be, for instance, raster images of portion of glass substrates with barcodes with various sizes, brightness's and aspect ratios and, associated to each image, an indication regarding the presence or not of a barcode in said image which provided as target. For the second convolutional neural network, the training set of images may be, for instance, cropped images of the set of training images of the first convolutional neural network and, as target, associated to each image, the corresponding tensor of probabilities forming an abstract representation of said image.

The number of images to use for the training depends on the complexity of the barcode and the quality, i.e. signal/noise ratio, of the image. As a rule of thumb, the more variety in training data, the better. In some cases, the available data may be too scarce and/or may be not varied enough for an efficient training. Advantageously, the set of training data used in the learning process of first trained convolutional artificial neural network and the second trained convolutional artificial neural network may comprise artificially generated data through data augmentation methods.

Data augmentation methods are well documented in the art. They often rely on geometric and colour-based transformations, e.g. horizontal/vertical flipping, padding and cropping, rotations.

As an illustrative example of training, it was found that, to detect and read 12.5×12.5 mm engraved 2D datamatrix in 400×400 px black backgrounded raster images of 100×100 mm surface portion of marked transparent glass substrate, a set of 5000 to 10000 different training images is enough to get a prediction accuracy up to 99% during the training stage and more that 96% during validation stage.

Figure 6:
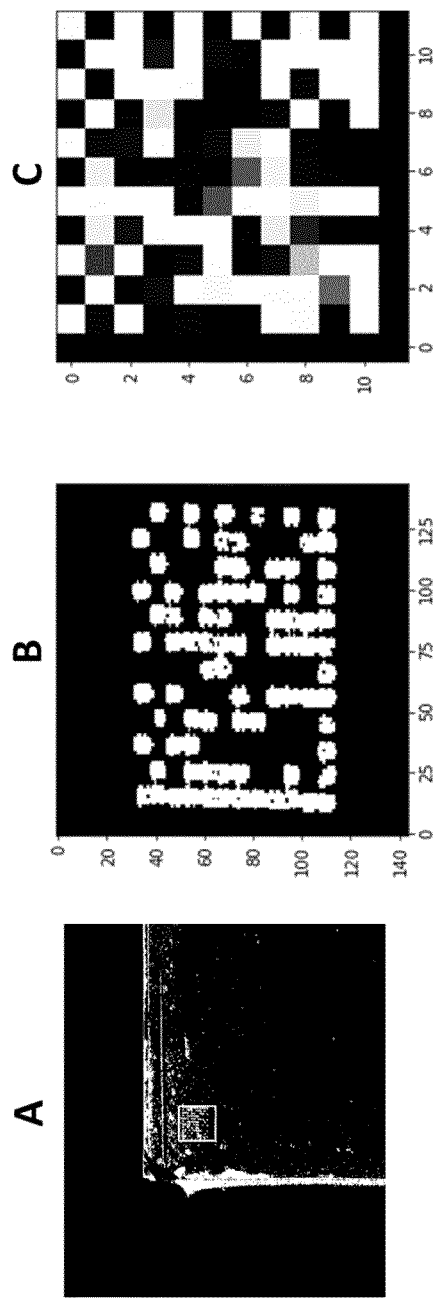
FIG. 6 depicts examples of a raster image of barcode before, during and after processing by the method according to the invention.

As an illustrative example of detection and reading, once trained with the afore mentioned training set, the method was used to detect and read a 2D matrix on a 400×400 px black backgrounded raster image of 100×100 mm surface portion of a marked transparent glass substrate. The image of the surface portion was acquired with a digital camera. FIG. 6A is the resulting image after step (b) of the method.

A datamatrix is detected and representative points of its boundary is materialized the white polyhedral frame, here a white square, centred on the datamatrix. On the FIG. 6A, the colour scale, i.e. greyscale or black and white, is inverted because of the transparency of the substrate.

FIG. 6B is the resulting cropped image D3002 after the cropping step (c) of the method. The image is cropped into a 144×144 px image according to the boundary computed at step (b). The aspect ratio of the datamatrix is not regular, the datamatrix has slanted shape like a lozenge.

FIG. 6C is the resulting 12×12 px abstract image as a graphic representation of the corresponding tensor D3003 of probabilities. On the figure, the colour scale is inverted with respect to FIG. 6A and FIG. 6B. The image has a standardized format with regular aspect ratio, brightness and resolution, and is ready to be decoded with an adapted decoding image processing algorithm.

This example shows clearly that the method is able to detect and read a barcode a barcode in an image of a marked glass substrate and transforms any raster image of that barcode into a standardized low memory image by keeping only the valuable information for a possible later on conversion into an alphanumeric number or other format.

Figure 7:
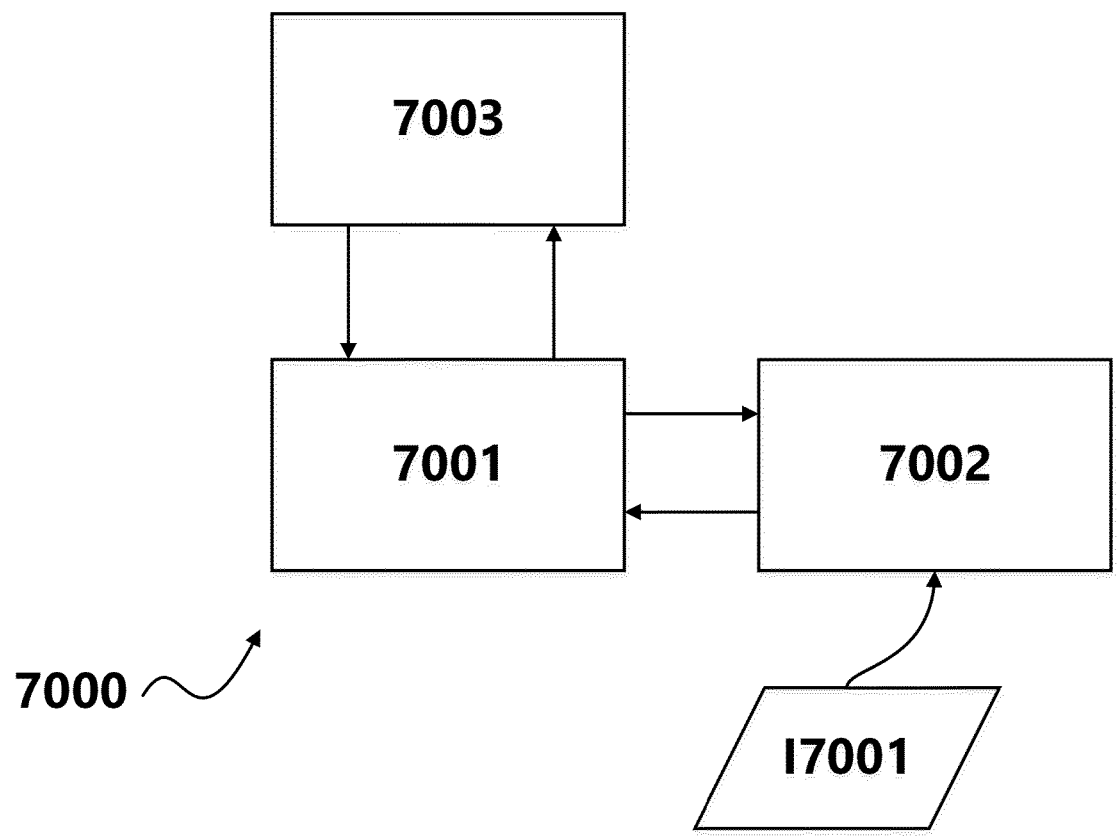
FIG. 7 is a physical data flow diagram of a processing data system.

The method of the invention is computer implemented. With reference to [FIG. 7], according to another aspect of the invention, there is provided a data processing system 7000 comprising means for carrying out the method 3000 according to any of the embodiments described herewith. Example of means for carrying out the method is a device 6001 which can be instructed to carry out sequences of arithmetic or logical operations automatically to perform tasks or actions. Such device, also called computer, can comprise one or more Central Processing Unit (CPU) and at least a controller device that are adapted to perform those operations. It can further comprise other electronic components like input/output interfaces 7003, non-volatile or volatile storages devices 7003, and buses that are communication systems for the data transfer between components inside a computer, or between computers. One of the input/output devices can be user interface for human-machine interaction, for example graphical user interface to display human understandable information.

The architecture of neural networks allows distribution of tasks for parallel computation. As the training of neural network requires a lot of computational power to process large amounts of data, the data processing system 7000 may advantageously comprise one or more Graphical Processing Units (GPU) whose parallel structure make them more efficient than CPU, in particular for image processing with convolutional neural networks.

Another object of the invention is to provide a computer program 17001 comprising instructions which, when the program is executed by a computer, cause the computer to carry out the method of the invention according to any embodiments described herein.

Any kind of programming language, either compiled or interpreted, can be used to implement the steps of the method of the invention. The computer program can be part of a software solution, i.e. part of a collection of executable instructions, code, scripts or the like and/or databases.

Another object of the invention is to provide a computer-readable medium 7002 comprising instructions which, when executed by a computer, cause the computer to carry out the method according to any of the embodiments described herein.

The computer-readable storage 7002 is preferably a non-volatile storage or memory, for example hard disk drive or solid-state drive. The computer-readable storage can be removable storage media or a non-removable storage media as part of a computer.

Alternatively, the computer-readable storage may be a volatile memory inside a removable media. This can ease the deployment of the invention into many production sites.

The computer-readable storage 7002 can be part of a computer used as a server from which executable instructions can be downloaded and, when they are executed by a computer, cause the computer to carry out a method according to any of the embodiments described herein.

Alternatively, the program may be implemented in a distributed computing environment, e.g. cloud computing. The instructions can be executed on the server to which client computers can connect and provide encoded data as inputs to the method of the invention. Once data are processed, the output can be downloaded and decoded onto the client computer or directly send, for example, as instructions. This kind of implementation can be advantageous as it can be realised in a distributed computing environment such as a cloud computing solution.

The method according to the invention is well adapted to be used in in a manufacturing process of glass, in particular transparent, substrates or glazing comprising glass, in particular transparent substrates. The method in its various embodiments herein described, may be advantageously used to detect tracking codes in acquired digital images of glass substrates and extract the codes from those images in an adequate format for their conversion into an alphanumerical number for further processing.

Advantageously, the method may be implemented in a process for detecting and reading a barcode marked on a glass substrate. For instance, the process may comprise the following steps:
  (a) acquiring at a raster image of at least one portion of the glass substrate with a digital camera;
  (b) providing the acquired raster image to a data processing system comprising means for carrying out a method according to any one of the claims 1 to 11.

It is to be understood that the embodiments described herein are the most preferred embodiments to describe the invention. These embodiments can be combined unless their respective functions appear incompatible for such combination.

It is to be further understood that the invention is not limited to the disclosed embodiments. It is intended to cover equivalent arrangements included within the scope of the claims.

The invention claimed is:

1. A computer implemented method for detecting and reading a barcode in an image of a marked glass substrate, said method taking as input a raster image of at least one portion of the marked glass substrate and providing as output an abstract image of said barcode, and said method comprising the following steps:
  (a) computing a probability occurrence θ of said barcode in the raster image with a first trained convolutional artificial neural network;
  (b) computing coordinates of representative points of a boundary of the barcode in the raster image according to a given threshold σ for the probability occurrence θ computed at step (a);
  (c) cropping the raster image to the boundary of the barcode according to said coordinates computed at step (b), and
  (d) computing with a second trained convolutional artificial neural network a tensor of probabilities for each pixel of the cropped raster image, said tensor being the abstract image of the barcode.

2. The computer implemented method according to claim 1, wherein the first trained convolutional artificial neural network is based on a Feature Pyramid Network architecture.

3. The computer implemented method according to claim 1, wherein the first trained convolutional artificial neural network comprises a residual neural network as backbone.

4. The computer implemented method according to claim 1, wherein the first trained convolutional artificial neural network is a network with at least 10 layers.

5. The computer implemented method according to claim 1, wherein the second trained convolutional artificial neural network is designed as a two-stage architecture, a first stage of the two-stage architecture producing features maps and a second stage of the two-stage architecture performing classification from features maps.

6. The computer implemented method according to claim 1, wherein the raster image is a one channel raster image.

7. The computer implemented method according to claim 1, wherein the set of training data used in a learning process of the first trained convolutional artificial neural network and the second trained convolutional artificial neural network comprises artificially generated data through data augmentation methods.

8. The computer implemented method according to claim 1, wherein the coordinates of representative points of boundary of the barcode are spatial coordinates of corners of the barcode, or spatial coordinates of a center of the barcode and dimensions of a model polyhedral frame centered on said center.

9. The computer implemented method according to claim 1, wherein the coordinates of representative points of boundary of the barcode are computed with the first trained convolutional neural network.

10. The computer implemented method according to claim 1, wherein the barcode is a linear barcode or a matrix barcode.

11. A data processing system comprising a data processing unit and a non-transitory computer readable medium comprising instructions to perform the method according to claim 1.

12. A non-transitory computer readable medium comprising instructions which, when executed by a computer, cause the computer to carry out a method according to claim 1.

13. A process comprising performing the method according to claim 1 to manufacture glass substrates or glazing comprising glass substrates.

14. A process for detecting and reading a barcode marked on a glass substrate, said process comprising the following steps:
  (a) acquiring a raster image of at least one portion of the glass substrate with a digital camera;
  (b) providing the acquired raster image to a data processing system comprising a data processing unit and a non-transitory computer readable medium comprising instructions to perform the method according to claim 1.

15. The computer implemented method according to claim 4, wherein the first trained convolutional artificial neural network is a network with at least 20 layers.

16. The computer implemented method according to claim 15, wherein the first trained convolutional artificial neural network is a network with at least 50 layers.

* * * * *